April 24, 1962 M. F. FIDLER 3,030,918
FOWL RELEASED AND RESET DOOR FOR A HEN'S NEST
Filed Sept. 14, 1960
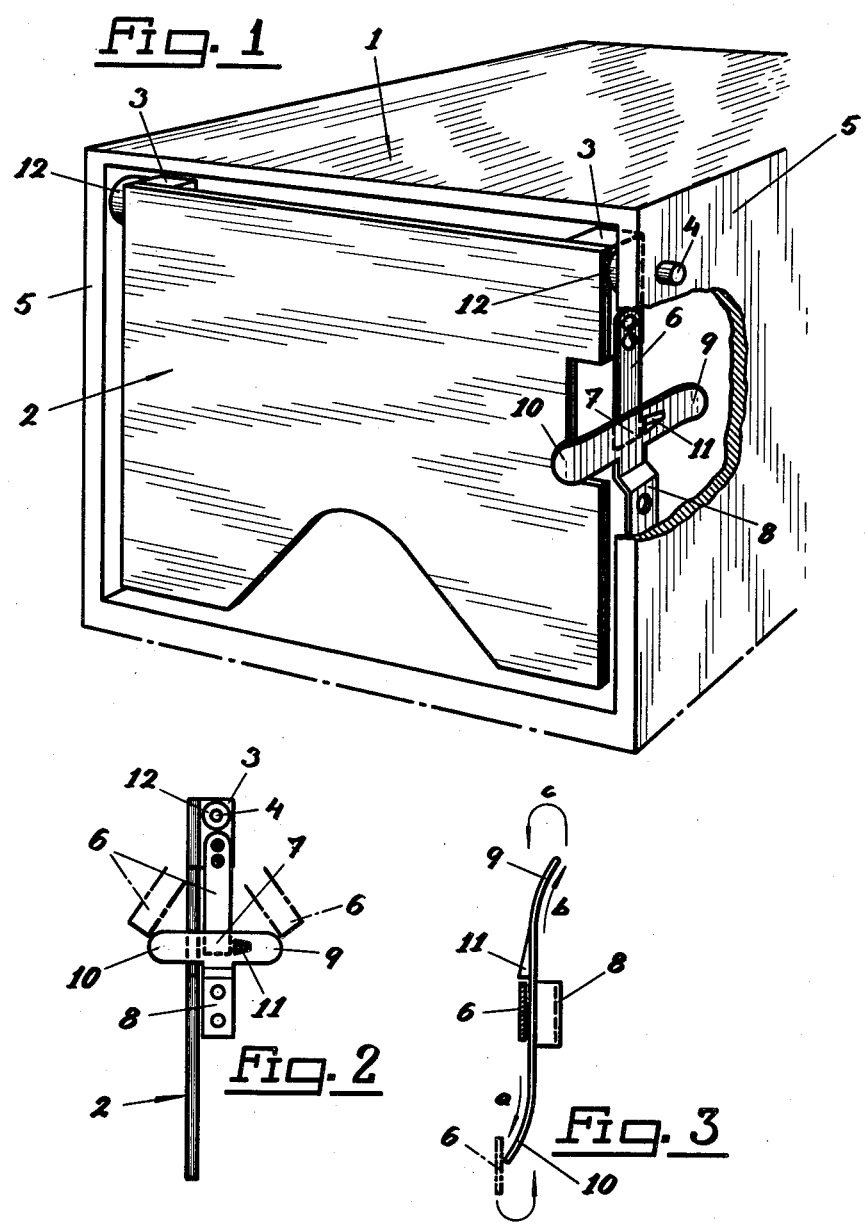

3,030,918
FOWL RELEASED AND RESET DOOR
FOR A HEN'S NEST
Matthews F. Fidler, Gaggegatan 6, Halmstad, Sweden
Filed Sept. 14, 1960, Ser. No. 56,041
Claims priority, application Sweden Oct. 28, 1959
2 Claims. (Cl. 119—50)

The present invention relates to egg-laying boxes of the kind provided with a hinged door which is normally kept in a closed position by a resilient force or by gravity and is intended to separate the laying compartment of the box from the environment for the purpose of sheltering a layer from the other hens at a poultry farm or the like.

Laying boxes for the purpose specified have already found extensive use at poultry farms, but the previously known types have been found to be deficient as regards reliability of function and have required continuous attendance and adjustment. The known types are usually provided with a hinged door which is kept open when the box is unoccupied by a hen, but which, as a hen enters the box, is closed by actuation of the floor of the laying compartment in that this floor is vertically movable to a limited extent. Such boxes must be kept carefully free from manure and other impurities to enable the floor as well as the movement transmitting mechanism to operate as smoothly as required to cause the boxes to function satisfactorily.

Now, according to the present invention, an egg-laying box has been provided which is structurally very simple and which requires a minimum of attendance because the number of movable parts has been minimized and because they are substantially completely independent of impurities occurring at a poultry farm. The invention, though structually simple, satisfies all demands for protection of a laying hen and is mainly characterized in that the box is provided with interlocking means preventing the door from being opened inwards more than once after each opening thereof outwards. Thus after a hen on entering the box has first caused the door to swing inwards from its closed position, and the door has then swung back into its closed position after the hen has entered the laying compartment, the door cannot be swung inwards again, for instance by another hen, until after the hen inside the box has left the latter and has thus swung the door outwards from its closed position. Thus there is no risk of a laying hen being subject to disturbance.

According to a suitable embodiment of the invention, said interlocking means may be constituted, on one hand, by a resilient arm connected to the door (or box) and, on the other hand, by an S-shaped cam member connected to the box (or door) and along which the free end of the arm is displaceable, the cam member being arranged with its intermediate portion extending substantially parallel to the direction of movement of the arm and having its end portions curved away from this direction so that, upon the door being opened towards the interior of the box, the arm will slide along one side of the cam member and will be forced laterally by one of said end portions until after having passed beyond this end portion it will spring back, and, as the door swings back towards its closed position, it will slide in the opposite direction along the other side of the cam member, the latter being provided on this side with a detent-like projection adapted, after the arm having passed by the same, to prevent the arm from being swung in the first-mentioned direction along this side of the cam member.

The invention will now be described more closely with reference to the accompanying drawing, in which:

FIG. 1 is a perspective view, partly broken away, of a laying box of the kind referred to;
FIG. 2 shows the mechanism on a slightly less scale and as seen in side view; and
FIG. 3 is a top-plan view of the cam member.

As shown in FIG. 1, the egg-laying box 1 is provided with a door 2 replacing one wall of the box. This door, being suitably a fibre-board plate, is provided on its inside face with two wooden blocks 3 or the like which are swingably mounted on a horizontal shaft 4 having its ends mounted in two opposite walls 5 of the box. One of said blocks 3 serves as an attachment for an arm 6 extending radially relative to the pivot shaft 4 and along one of the vertical edges of the door. The free end portion of this arm, the latter consisting of a piece of spring-steel strip or other suitable material, is arranged to cooperate with a cam member 7 and to form together with the latter the interlocking device previously referred to. The cam member consists of a slightly S-curved strip which by means of a bracket 8 is attached to, and slightly spaced from the inner surface of one wall 5 and is so disposed that the intermediate portion of the cam member extends in spaced and substantially parallel relation to the wall and in the direction of movement of the arm, whereas, the end portions 9, 10 of the metal strip 7 are bent off, one towards the wall and the other away from it. Whenever, on opening the door outwards from the box, the arm is displaced from its position shown in full lines in the drawing, the arm at the same time will be moved slightly laterally, as shown by the arrow in FIG. 3. Owing to the fact that the arm will thereby be tensioned, it will spring back as soon as it has passed beyond the end portion 10 of the metal strip, whereby, as the door is swung back by gravity towards its closed position, the arm will slide along the opposite side of the cam strip up to a position opposite to that shown in full lines in FIG. 3. Thus the device will occupy this position when a hen has left the laying compartment which can then again receive a hen who will open the door inwards upon entering the box. When this takes place, the arm is displaced inwardly along the metal strip 7, as indicated by the arrow b, which shows also that the arm is now tensioned in a direction opposite to that of the first-mentioned instance. Thus, as the arm has passed beyond the inner end portion 9 of the metal strip, it will spring back, as is also indicated by an arrow c. When the hen has entered the box, the door will swing by gravity into its closed position thereby displacing the arm outwards along the first-mentioned side of the cam strip, the latter being provided on this side with a detent-like projection 11 which can be passed by the arm during said displacement. Thus, as the door has reached its closed position, the arm will have resumed the position shown in full lines in the drawing and in which the inner edge of the arm engages the face of the detent 11 extending at right angles to the direction of movement of the arm. This cooperation between the arm and detent results in that the door cannot again be swung inwards to let in another hen, unless the door has not first been swung outwards, and this will only take place as a hen leaves the laying compartment.

It will be seen that this construction is very simple in its design, and it has been found that laying boxes constructed in this way are very reliable in operation and that they require a minimum of maintenance and attendance. It should be understood, however, that the embodiment exemplified in the drawing should by no means be considered to be the only suitable one within the scope of the invention, since the interlocking means may be subject to certain changes.

Since it might happen, on a particularly forceful actuation, that the door could be moved inwards to an extent such that, when the door swings outward again, the arm will pass completely beyond the cam strip, thus causing incorrect operation of the device, a suitable braking element may be disposed as indicated at 12.

It is understood, of course, that an interlocking device of the kind described could find use also in other fields of application where a body is displaceable or swingable between a central operative position and two end positions. Therefore, the invention should not be considered to be restricted exclusively to egg-laying boxes, this being merely one suitable field of application chosen by way of example.

What is claimed is:

1. In an egg-laying box of the type having a door opening, a hinged door openable both outwards and inwards and normally biased to a closed intermediate position and intended to close the box, latch means comprising a resilient arm connected to the door, and a detent means secured to the edge of the door opening, said detent means being mounted on an S-shaped tongue along both sides of which the free end of the resilient arm is slidable, the S-shaped tongue being arranged with its intermediate portion extending substantially parallel to the direction of movement of the arm and having its end portions curved the outer end toward and the inner end away from the door opening so that, upon the door being opened towards the interior of the box, the arm will slide along the side of the tongue away from the door opening and will be forced laterally by the inner of said end portions until, after having passed beyond this end portion, it will spring back and, as the door swings back towards its closed position, it will slide in the opposite direction along the other side of the S-shaped tongue on which the detent is arranged, so that after the arm has passed the detent the arm is prevented from being swung in the first-mentioned direction along this side of the tongue, and upon further movement outwardly from the closed position of the door, the tongue will be forced laterally then, having passed the end of the S-shaped tongue will spring back so as to again contact the side of the S-shaped tongue remote from the door opening.

2. A latch for regulating the movement of two relatively swingable elements, said latch comprising a resilient arm mounted on one of said swingable elements and capable of being deflected in the plane of one of the swingable elements but being rigid in other planes, and an elongated S-shaped tongue having its central portion normally lying in a plane normal to the plane in which said resilient arm can be deflected, the ends of said S-shaped tongue extending in opposite directions out of the plane of the swinging motion whereby, upon swinging said two relatively swingable elements with respect to each other, said resilient arm will pass back and forth over alternate sides of said S-shaped tongue, at least one side of said S-shaped tongue being provided with a detent projection so that as said resilient arm is swung to a mid-position along said S-shaped tongue it cannot be swung in the reverse direction.

References Cited in the file of this patent
UNITED STATES PATENTS
264,293   Householder _____ Sept. 12, 1882